United States Patent Office 3,054,507
Patented Sept. 18, 1962

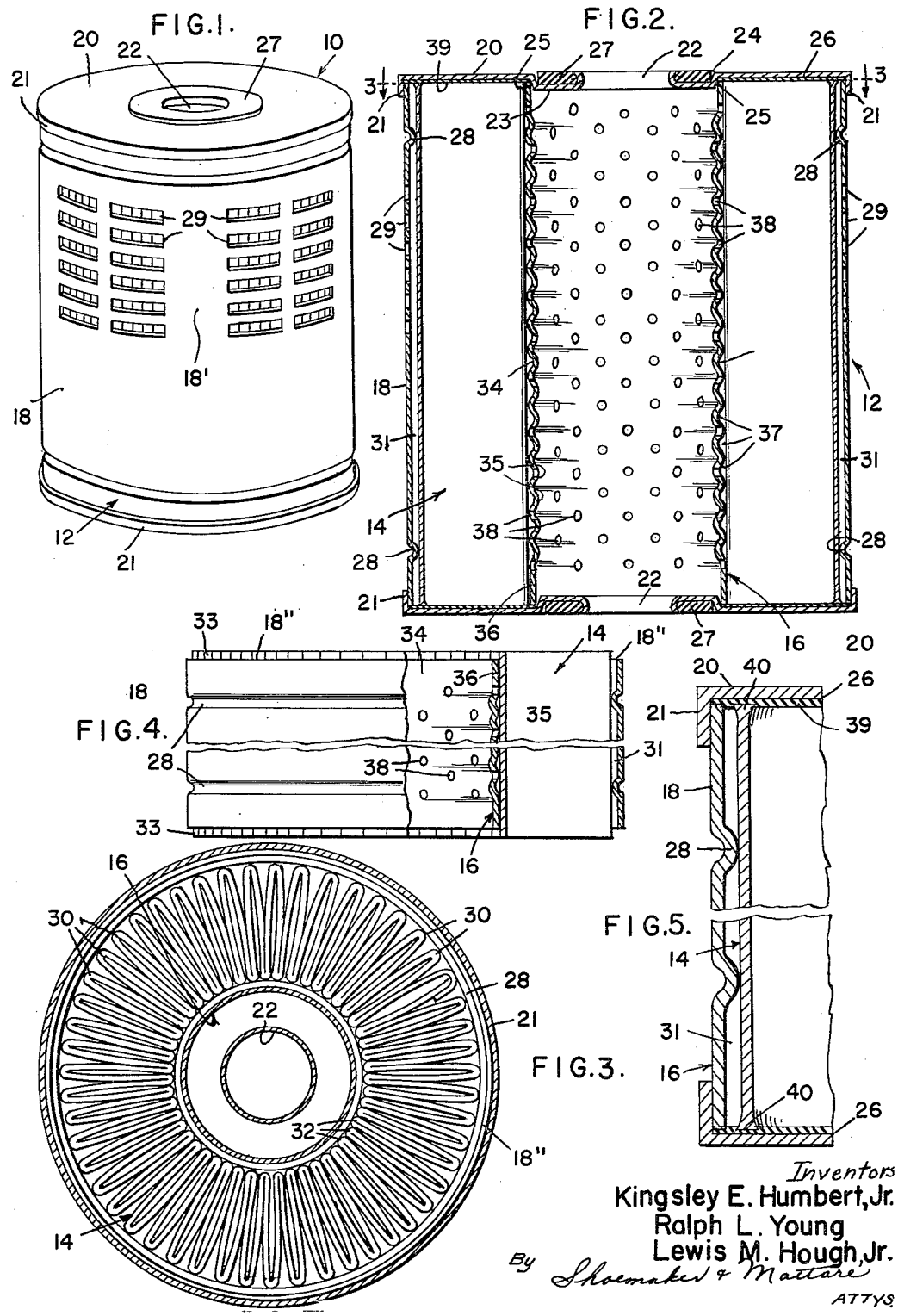

3,054,507
REPLACEABLE FILTER CARTRIDGES
Kingsley E. Humbert, Jr., Ralph L. Young, and Lewis M. Hough, Jr., Gastonia, N.C., assignors to Wix Corporation, Gastonia, N.C., a corporation of North Carolina
Filed Jan. 5, 1955, Ser. No. 479,924
1 Claim. (Cl. 210—493)

This invention relates generally to the class of filters and is directed particularly to improvements in replaceable filter units or cartridges.

Replaceable filter units or cartridges are known wherein the filter element is in the form of a pleated tubular or annular body shaped from a sheet of filter paper or other sheet filtering material and enclosed in a can or cylinder of metal or other material and such cartridges are adapted to be placed in a housing or shell into which the liquid to be filtered is run to pass through the replaceable cartridge unit and out in clean condition for reuse, leaving the impurities behind in the unit. In such known types of cartridges the outer folds of the pleated unit are in contact with the wall of the can or cylinder and accordingly the free circulation around the filter element of the liquid to be filtered is restricted by reason of such arrangement. It is accordingly an object of the present invention to provide a new type of replaceable filter cartridge having a pleated annular filtering unit enclosed within a can of suitable material, wherein the outer folds of the pleated unit are maintained in spaced relation with the wall of the encasing can structure whereby a free and substantially unrestricted circulation of liquid around the filter unit in the enclosing can structure is permitted and the liquid may readily pass either inwardly or outwardly through the filter element from anywhere around the same whereby the maximum filtering action of the filter element is obtained.

Filter cartridges of the character to which the present invention relates are designed for use in high pressure systems and the filter element in the cartridge is accordingly subjected to heavy pressure in the passage of the liquid therethrough and it is, accordingly, another object of the invention to provide a filter cartridge employing a pleated annular unit of the character stated wherein means is provided in and extending through the center of such pleated filter element to firmly support the same whereby to avoid collapse of the element when the same is subjected to pressure, while at the same time permitting the free radial flow of the liquid through the filtering element.

Another object of the invention is to provide a replaceable filter cartridge of the character referred to, having a supporting or stiffening means extending through the annular pleated filter element, which supporting or stiffening means is in the form of a perforated and corrugated cylinder.

The replaceable cartridge of the present invention is designed so that it may be used in a housing or shell of a construction wherein the cartridge is secured in working position between opposing pressure applying means and, accordingly, a further object is to provide a cartridge comprising a metal cylinder in which the annular pleated filter element is housed, with metal heads closing the ends of the cylinder and against which the opposing pressures are applied, with means interposed between and engaging the heads or supporting the latter and which means also functions to support and reinforce the annular pleated filter element.

A still further object of the invention is to provide a new and novel filter cartridge comprising a cylinder encasing an annular pleated filter element and having metal heads closing the ends thereof, wherein a metal to paper seal is effected between the inner faces of the heads and the opposing ends of the pleats of the filter element which effectively prevents the passage of liquid across the ends of the filter element between the latter and the cylinder heads.

Still another object of the invention is to provide, in a replaceable filter cartridge of the character stated, an encasing can or cylinder for the filter element, having end walls of uniform thickness wherein the central portion of each wall has a circular, inwardly extending depression or recess whereby a sealing washer may be attached without sacrificing the thickness of such washer in the overall length of the folded or pleated filter element.

By the provision of the depressions in the end walls or heads for the filter element enclosing cylinder, there is provided an internal circular projection adapted to enter the ends of a tubular stiffening body extending through the filter element, which depressions function to hold such stiffening body properly centered in the can or cylinder between the end walls or heads thereof.

Still another object of the invention is to provide a new replaceable filter unit or cartridge comprising a cylinder with flat heads secured to and closing the ends thereof and having therein a tubular pleated filter element in which the pleats extend lengthwise of the cylinder, with means for maintaining the outer folds of the pleats in spaced relation with the wall of the cylinder whereby to provide a fluid circulating chamber entirely around the pleated element within the cylinder, said means comprising an annular inwardly projecting bead or rib adjacent to the two ends of the cylinder.

Still another object of the invention is to provide a new replaceable filter cartridge of the character defined in the preceding paragraph wherein said bead or rib constitutes an inpressed portion of the material of the cylinder.

A further object is to provide a replaceable filter cartridge of the above described character wherein a means is provided for effectively trapping grit and other particles in the lower portion of the cylinder by the provision of fluid transfer passages or openings in the cylinder wall in the upper portion or upper half thereof.

The means whereby the foregoing and other objects may be attained will become apparent from the following description taken in association with the accompanying drawing forming a part of the specification, with the understanding, however, that the invention is not confined to a strict conformity with the showing of the drawing but may be changed or modified within the scope of the appended claims.

In the drawing:

FIG. 1 is a view in perspective of the new replaceable filter cartridge constructed in accordance with the present invention.

FIG. 2 is a vertical longitudinal section through the same, on a slightly enlarged scale.

FIG. 3 is a transverse section taken substantially in the plane of section line 3—3 on FIG. 2, the ends of the cylinder, the filter element pleats and the reinforcing central corrugated tube being in elevation.

FIG. 4 is a view partly in elevation and partly in longitudinal section of the filter element enclosing cylinder at the upper and lower ends only, the central portion being broken away and showing the same before the application of the heads or end walls, illustrating a slight projection of the ends of the filter element beyond the ends of the cylinder.

FIG. 5 is a detailed fragmentary sectional view on a greatly enlarged scale illustrating the bond or seal between the end edges of the filter element pleats and the cylinder end walls or heads.

Referring now more particularly to the drawing the numeral 10 generally designates the replaceable filter cartridge. This comprises broadly the three units consisting of the element enclosing can 12, the filter element or unit therein which is generally designated 14 and the central reinforcing corrugated and apertured tube or inner cylinder 16.

The can unit 12 comprises the cylindrical wall portion 18 preferably of metal, having the end closing heads or walls 20 each of which is encircled by a flange 21 within which the end of the cylindrical wall 18 fits as shown.

In the completed cartridge the ends of the cylindrical wall 18 are press fitted into the encircling flanges of the closing end walls so that such end walls cannot become loose or disengaged from the side or cylindrical wall.

Each end wall has a central opening 22 therein and a portion 23 of the material of the wall around this opening is pressed in to form a shallow annular channel 24, the outer portion of which is defined by the inwardly disposed circular shoulder 25.

By the provision of the impressed portion 23 there is not only provided the annular recess 24 around the opening but there is also provided around this outwardly opening recess the inwardly facing wider recess between the shoulder 25 and the flange 21, which latter recess is designated 26 and in which a coating or layer of adhesive material is placed for the hereinafter described purpose.

Disposed within the annular outwardly facing or opening recess 24 of each end wall is a flat annular sealing gasket 27 the thickness of which approximates the depth of the recess 24 in which it is located and the opening of the gasket is slightly smaller than the opening 22 which it encircles so that the edge of the opening, or a portion of the inpressed part 23 around the opening, may be turned out through the opening of the gasket to engage the edg of the latter as indicated at 27 to lock the gasket in position.

The cylindrical wall 18 of the filter element enclosing can or receptacle has, adjacent each of its ends an inpressed circular or annular portion forming an inwardly projecting bead or rib 28 for the purpose hereinafter set forth. This bead or rib preferably is continuous or extends entirely through the circumference of the cylindrical wall.

While the bead or rib 28 has been illustrated and described as forming an inpressed portion of the material of the wall and this construction is preferred, it may also be provided in any other suitable manner as by the application of a suitable annulus to the inside of the wall 18 whereby the same desirable result of spacing the filter element as hereinafter explained, may be attained.

The cylindrical wall 18 is also provided adjacent to one end thereof or in approximately one-half of its length, with a number of liquid transmission openings or ports 29. While these ports may be of any desired form or in any suitable or desired arrangement, it is preferred that they be of rectangular contour with the length directed circumferentially and arranged in groups as illustrated in FIG. 1. By this arrangement, ample provision is made for the passage of oil or other liquid to or from the filter element without materially weakening the wall since the groups of openings or ports are separated by a substantial width of the wall body as indicated at 18'.

The filter cartridge when in use is disposed in the upright position in which it is here illustrated with the ports 29 at the top and, therefore, in further describing the cartridge structure reference to the top end thereof will designate the end nearest to the ports 29.

The filter element generally designated 14 is of the pleated form illustrated in FIG. 3 and is fabricated of suitable filter paper and when installed in the cylinder has the pleats thereof relatively closely associated or pressed together. The overall diameter of the annular filter element approximates the inside diameter of the spacing ribs or beads 28 so that when the unit is installed the outer fold edges 30 of the pleats will be encircled and engaged by the spacing ribs 28 to provide the annular fluid space 31 around the element and between the pleat outer edges 30 and the wall of the cylinder as is clearly shown in FIGS. 2 and 5.

The inside edges of the pleats are designated 32 and the circular area or space, extending lengthwise of the cartridge, defined by these inner edges, is of a diameter slightly less than the diameter of the shoulders 25 with which the filter element is concentrically arranged.

The overall length of the pleated filter element 14 is slightly greater than the length of the cylindrical wall 18 so that when the filter element is located within the cylinder portions, the ends of the pleats may extend slightly beyond the end edges of the cylinder as illustrated in FIG. 4 where the projecting end edges of the pleats are designated 33 and the adjacent end edges of the cylinder are designated 18''. The novel result attendant upon this slight extension of the ends of the pleats of the filter element beyond the ends of the cylindrical wall 18 will be hereinafter set forth in connection with the sealing of the end walls or heads on the ends of the wall 18.

The reinforcing unit 16 which extends through the center of the annular filter element 14 comprises a tube, the wall 34 of which has corrugations 35 formed circumferentially thereof and extending throughout the length thereof between the short uncorrugated terminal portions 36.

The inside diameter of the corrugated tube approximates the overall diameter of the shoulders 25 which fit snugly in the ends of the tube in the assembled cartridge structure and the outside diameter of the tube approximates the inside diameter of the pleated annular filter element whereby the inner edges 32 of the pleats contact the high points of the corrugations, providing between such high points the channels 37 extending across the inner edges 32 of the pleats. Thus by the provision of the circumferential corrugations in the center tube provision is made for circulation of liquid around the tube across the edges 32 of the pleats as well as longitudinally of the reinforcing tube and the filter element.

To provide for radial flow of liquid through the filter element the wall 34 of the reinforcing tube is densely perforated in a suitable manner, the tube here being illustrated as having a multiplicity of apertures 38 formed indiscriminately therethrough.

In order to prevent the bypassing of liquid across the ends of the filter element between the ends of the pleats and the cylinder heads or end walls, a metal to paper bond or seal is effected by means of a suitable adhesive layer 39 applied to the inner face of each end wall or head throughout the inwardly facing channel portion 26 thereof into which the ends of the filter element pleats extend when the heads are applied and secured to the ends of the cylinder wall 18.

The adhesive or sealing material may be of any suitable character which will be unaffected by oil or other liquids passing through the filter such, for example, as a suitable thermosetting plastic.

In the assembling of the units making up the cartridge structure it will be seen that by reason of the slightly greater length of the filter element than the cylindrical wall 18, when the heads 20 are applied, each having had previously applied to its inner surface in the recess 26 thereof a suitable layer of adhesive or bonding material, and pressed to position upon the ends of the cylinder wall 18, the end edges of the pleats of the filter element will be firmly compressed or mashed into the adhesive and spread out, widened or splayed transversely slightly as indicated at 40 in FIG. 5 so that a wider end surface of each pleat will be presented to the opposing surface of the head 20 and the adhesive will be pressed in between the fibers of the filter paper and the desired bond effected between the paper and the metal head.

While the filter cartridge of the present invention may be employed in any suitable housing or shell to which it is applicable it is designed primarily for use in a shell wherein the cartridge is firmly secured between two opposing members which bear against the gaskets 27 and form a tight seal which prevents the passage of liquid between such members and the end walls of the cartridge to the openings 22. These openings 22 also accommodate conduits by means of which the liquid to be filtered is passed into the cartridge encasing shell or housing for transmission from the outside radially inwardly to the perforated reinforcing central unit 16 from which it passes to a suitable discharge or outlet conduit. While, when used in connection with the housing or shell of this character, the liquid passes radially inwardly it is to be understood that the cartridge may also be used and is equally effective in its filtering action by introducing the liquid to be filtered into the perforated tube unit 16 and forcing it radially outwardly for discharge through the wall ports 29.

While in the preceding description it has been stated that the inner surface of each end wall 20 has a coating of adhesive applied thereover, into which the end edges of the paper filter are pressed, and this construction has been illustrated, another method of securing the desired bond between such end edges and the opposing surfaces of the end walls, is by dipping the ends of the fluted filter unit in the adhesive and then, after it is inserted in the cylindrical portion 18, applying the end wall.

Another advantage to be derived from the provision of the filter unit 14 of slightly greater length than the cylinder 18, is that the joining of the end edges of all of the flutes is assured even though there may be some slight irregularity, or unevenness, in the edge contour.

From the foregoing it will be readily apparent that there is provided by the present invention a new and novel replaceable filter cartridge which is designed to function efficiently under high pressure and in which, by reason of the novel spacing of the fluted annular filter element from the wall of the encasing cylinder the maximum of filtering efficiency is derived from the filter unit by reason of the fact that the liquid can circulate freely around the filtering unit in the encasing cylinder. Also by reason of the novel placement of the liquid transfer ports 29 in the upper end portion of the filter element enclosing cylinder, the lower portion of this cylinder between the wall and the filter element provides an effective sediment trap particularly in the use of the cartridge in a housing or shell where the unfiltered liquid flows in through the ports 29 to pass radially toward the center of the cartridge.

We claim:

A replaceable filter unit comprising a receptacle having a cylindrical side wall and circular top and bottom end walls overlying the ends of the side walls and secured thereto, each of said end walls having a circular central portion thereof offset inwardly forming a shallow central outwardly opening recess on the outside and a circular shoulder on the inner side, said inset portions each having a central opening therethrough, an elongate pleated filter element of annular cross-sectional form within and extending lengthwise of the cylinder between and engaged at its ends by said end walls, the inside diameter of the element being such as to receive and encircle said end wall shoulders, a cylindrical reinforcing element extending through and snugly embraced by the filter element and having each end in encircling engagement with a circular end wall shoulder, and means for admitting liquid into the receptacle through the side wall in the upper end portion only of the receptacle, a flat annular gasket lying in each shallow recess and encircling the central opening and means securing each gasket in its recess comprising a flange forming an outturned portion of the edge of the opening and curving outwardly away from the center of the opening over the inner edge of the adjacent gasket.

References Cited in the file of this patent

UNITED STATES PATENTS

| | | |
|---|---|---|
| 1,753,809 | Short | Apr. 8, 1930 |
| 2,298,980 | Sloan et al. | Oct. 13, 1942 |
| 2,395,449 | Briggs | Feb. 26, 1946 |
| 2,401,987 | Taylor et al. | June 11, 1946 |
| 2,468,862 | Briggs | May 3, 1949 |
| 2,537,897 | Hunter | Jan. 9, 1951 |
| 2,537,992 | Gross et al. | Jan. 16, 1951 |
| 2,544,169 | Manning et al. | Mar. 6, 1951 |
| 2,559,614 | Hapman | July 10, 1951 |
| 2,562,361 | Kasten | July 31, 1951 |
| 2,569,243 | Kovacs | Sept. 25, 1951 |
| 2,577,169 | Von Pentz | Dec. 4, 1951 |
| 2,608,500 | Del Mar et al. | Aug. 26, 1952 |
| 2,642,187 | Bell | June 16, 1953 |
| 2,642,188 | Layte et al. | June 16, 1953 |
| 2,657,806 | Launder | Nov. 3, 1953 |
| 2,683,536 | Kasten | July 13, 1954 |
| 2,759,610 | James | Aug. 21, 1956 |

FOREIGN PATENTS

| | | |
|---|---|---|
| 72,754 | Germany | Jan. 15, 1894 |
| 865,786 | France | June 3, 1941 |